United States Patent
Dockter et al.

(10) Patent No.: US 11,166,403 B2
(45) Date of Patent: Nov. 9, 2021

(54) STEERED CASTER WHEEL SYSTEMS

(71) Applicant: Vermeer Manufacturing Company, Pella, IA (US)

(72) Inventors: Nathan D. Dockter, Pella, IA (US); Kent L. Thompson, Otley, IA (US); Curt T. Graham, Lynnville, IA (US); Kent M. Recker, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 429 days.

(21) Appl. No.: 16/099,601

(22) PCT Filed: May 19, 2017

(86) PCT No.: PCT/US2017/033596
§ 371 (c)(1),
(2) Date: Nov. 7, 2018

(87) PCT Pub. No.: WO2017/201439
PCT Pub. Date: Nov. 23, 2017

(65) Prior Publication Data
US 2019/0124820 A1 May 2, 2019

Related U.S. Application Data

(60) Provisional application No. 62/338,812, filed on May 19, 2016, provisional application No. 62/338,850, filed on May 19, 2016.

(51) Int. Cl.
*A01B 69/00* (2006.01)
*B60B 33/02* (2006.01)
(Continued)

(52) U.S. Cl.
CPC ............ *A01B 69/007* (2013.01); *A01B 49/00* (2013.01); *A01F 15/08* (2013.01); *B60B 33/026* (2013.01); *A01F 2015/186* (2013.01); *B62D 7/08* (2013.01)

(58) Field of Classification Search
CPC ....... A01B 69/007; A01B 69/00; A01B 49/00; A01F 15/08; A01F 2015/186;
(Continued)

(56) References Cited

U.S. PATENT DOCUMENTS 2,651,377 A   9/1953   Lapsley et al.
2,818,125 A   12/1957  Vogelaar
(Continued)

FOREIGN PATENT DOCUMENTS

CA   2852288 A1   11/2015
GB   2309014 A    7/1997
(Continued)

OTHER PUBLICATIONS

International Search Report and Written Opinion for International Application No. PCT/US17/33615, dated Oct. 12, 2017, 12 pages.
(Continued)

*Primary Examiner* — Anne Marie M Boehler
(74) *Attorney, Agent, or Firm* — Armstrong Teasdale LLP

(57) ABSTRACT

Steered caster wheel systems that include a disengagement system to enable a caster wheel steering mode and non-caster wheel steering mode are disclosed. In some embodiments, the caster wheels are mounted to a subframe that may be independently suspended from the chassis of a vehicle such as a self-propelled vehicle.

18 Claims, 15 Drawing Sheets

(51) Int. Cl.
*B62D 7/08* (2006.01)
*A01B 49/00* (2006.01)
*A01F 15/08* (2006.01)
*A01F 15/18* (2006.01)

(58) Field of Classification Search
CPC ......... B60B 33/026; B60B 33/02; B60D 7/08; B60D 9/002; B60D 11/04; B60D 9/00; B62D 7/08; B62D 9/002; B62D 11/04; B62D 9/00
USPC .................... 280/124.148, 124.153
See application file for complete search history.

(56) References Cited

U.S. PATENT DOCUMENTS

| | | |
|---|---|---|
| 3,075,233 A | 1/1963 | Lorenz |
| 3,234,856 A | 2/1966 | Martin |
| 3,612,199 A | 10/1971 | Vissers et al. |
| 3,888,323 A | 6/1975 | Patton et al. |
| 4,077,490 A | 3/1978 | Casterton et al. |
| 4,320,810 A * | 3/1982 | Hillmann ................. B62D 9/00 180/6.3 |
| 5,000,477 A * | 3/1991 | Minakawa ............. B60G 3/202 280/124.136 |
| 5,515,669 A | 5/1996 | Schick et al. |
| 6,076,613 A | 6/2000 | Frasier et al. |
| 6,668,965 B2 | 12/2003 | Strong et al. |
| 7,237,629 B1 | 7/2007 | Bland et al. |
| 7,549,279 B2 | 6/2009 | Mérant et al. |
| 7,918,304 B2 | 4/2011 | Perry et al. |
| 7,918,305 B2 * | 4/2011 | Scherbring ............ B62D 7/142 180/408 |
| 8,186,697 B2 | 5/2012 | Stephenson et al. |
| 8,267,205 B2 | 9/2012 | Ishii et al. |
| 8,496,256 B2 | 7/2013 | Bebemes et al. |
| 8,657,041 B2 | 2/2014 | Ishii et al. |
| 8,690,171 B2 | 4/2014 | Clark |
| 8,700,269 B2 | 4/2014 | Hubalek et al. |
| 8,733,770 B2 | 5/2014 | Nafziger et al. |
| 8,893,831 B2 | 11/2014 | Otto et al. |
| 8,950,520 B2 | 2/2015 | Hauser et al. |
| 8,997,902 B2 | 4/2015 | Pierce et al. |
| 9,120,504 B2 | 9/2015 | Bebernes et al. |
| 9,380,737 B2 | 7/2016 | Bebernes et al. |
| 9,408,344 B1 * | 8/2016 | Langenfeld ............ A01D 34/66 |
| 9,421,999 B2 | 8/2016 | Rotole et al. |
| 9,439,341 B2 | 9/2016 | Bebernes et al. |
| 2005/0115746 A1 | 6/2005 | Dunn et al. |
| 2011/0254241 A1 | 10/2011 | Piontek et al. |
| 2012/0232760 A1 | 9/2012 | Hubalek et al. |
| 2013/0075169 A1 | 3/2013 | Otto |
| 2013/0282212 A1 * | 10/2013 | Michael .............. B62D 11/003 701/22 |
| 2014/0138165 A1 * | 5/2014 | Bebernes ............. B62D 11/005 180/6.3 |
| 2014/0138166 A1 | 5/2014 | Otto et al. |
| 2015/0039171 A1 | 2/2015 | Koike et al. |
| 2015/0151781 A1 | 6/2015 | Hauser et al. |
| 2015/0191201 A1 | 7/2015 | Schaedler et al. |
| 2015/0223386 A1 | 8/2015 | Nafziger et al. |

FOREIGN PATENT DOCUMENTS

| | | |
|---|---|---|
| TW | 201111188 A | 4/2011 |
| WO | 2009059396 A1 | 5/2009 |
| WO | 2014017089 A1 | 1/2014 |

OTHER PUBLICATIONS

Épandage de compost de fumier de champignon, 1 page, retrieved from https://youtu.be/qlLwl1KW4Kc, Jan. 28, 2015.
New Holland Braud VL 6080 Grape Harvester, 1 page, retrieved from https://www.youtube.com/watch? v=Xn5wuyyx3bA, Aug. 29, 2014.
Chapter 3 Pneumatic 3 Position Cylinders, 1 page, retrieved from https://www.youtube.com/watch?v=NGWKghY-w0A, Mar. 19, 2014.
International Search Report and Written Opinion for International Application No. PCT/US17/33596, dated Oct. 13, 2017,15 pages.
Challenger: WR Series Self-Propelled Windrowers, AGCO Corporation, 2015, 28 pages.
New Holland, Speedrower Self-Propelled Windrower, 1 page, available before May 19, 2018.
WR Series RearSteer, 1 page, retrieved from https://youtu.be/DQZdRhqCSo, Aug. 27, 2015.

* cited by examiner

STEERED CASTER WHEEL SYSTEMS

CROSS-REFERENCES TO RELATED APPLICATIONS

The present application is a 35 U.S.C. § 371 national stage application of PCT/US2017/033596, filed May 19, 2017, which claims the benefit of U.S. Provisional Patent Application No. 62/338,850, filed May 19, 2016, and U.S. Provisional Patent Application No. 62/338,812, filed May 19, 2016, each of which is incorporated herein by reference in its entirety.

FIELD OF THE DISCLOSURE

The field of the disclosure relates to steered caster wheel systems and, in particular, caster wheel systems that may include a disengagement system to enable a caster wheel steering mode and a non-caster wheel steering mode.

BACKGROUND

Swiveling caster wheels may be used in various implements such as in zero-turn radius mowers or in various agricultural implements. The caster wheels may be offset from their swivel or steering axis which allows the wheels to self-align to the direction of travel of the implement. In some applications, it is desirable to steer the caster wheel to control its swivel position.

Conventional methods for steering caster wheels may involve drive by wire systems that include caster position sensors which add to the complexity of the caster assemblies. Further, vehicles may encounter unintentional "bump-steer" in which the caster wheels pivot an amount upon encountering a change in the terrain.

A need exists for steerable caster systems that may be operated in a caster wheel steering mode and a non-caster wheel steering mode, that involve mechanical connections between the steering mechanism and the caster wheels and that reduce bump-steer during caster wheel steering modes.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a steered caster wheel system having a vertical axis. The system includes a caster wheel having a steering axis. The caster wheel rotates about the steering axis through a range of swivel positions. The system includes a suspension mechanism. The caster wheel is mounted to the suspension mechanism to enable the caster wheel to move relative to the vertical axis. A steering mechanism is connected to the caster wheel to control the swivel position of the caster wheel. A steering actuator is connected to the caster wheel and the steering mechanism. A disengagement system selectively enables the steering actuator to change the swivel position of the caster wheel in response to movement of the steering mechanism in a caster wheel steering mode and disables the steering actuator from changing the swivel position of the caster wheel in a non-caster wheel steering mode.

Another aspect of the present disclosure is directed to a steered caster wheel system. The system includes a caster wheel having a steering axis. The caster wheel rotates about the steering axis through a range of swivel positions. An axle is rotatably connected to the caster wheel with a caster wheel rotational axis extending through the axle. A steering mechanism is connected to the caster wheel to control the swivel position of the caster wheel. A steering actuator is connected to the steering mechanism. Mechanical steering linkages connect the steering mechanism and the caster wheel. A disengagement system selectively enables the steering actuator to change the swivel position of the caster wheel in response to movement of the steering mechanism in a caster wheel steering mode and disables the steering actuator from changing the swivel position of the caster wheel in a non-caster wheel steering mode.

A further aspect of the present disclosure is directed to a steered caster wheel system. The system includes a caster wheel having a steering axis. The caster wheel rotates about the steering axis through a range of swivel positions. The system includes a steering mechanism for controlling the swivel position of the caster wheel. The system includes a steering actuator and a disengagement cylinder connected to the steering actuator and connected to the caster wheel. The disengagement cylinder selectively enables the steering actuator to change the swivel position of the caster wheel in response to movement of the steering mechanism in a caster wheel steering mode and disabling the steering actuator from changing the swivel position of the caster wheel in a non-caster wheel steering mode.

Yet another aspect of the present disclosure is directed to a vehicle having steerable suspended caster wheels and a vertical axis. The vehicle includes a chassis and first and second subframes independently suspended from the chassis to allow each subframe to move toward the chassis relative to the vertical axis. The system includes first and second caster wheels. Each caster wheel is mounted to a subframe. The system includes a steering system for controlling the orientation of both caster wheels.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
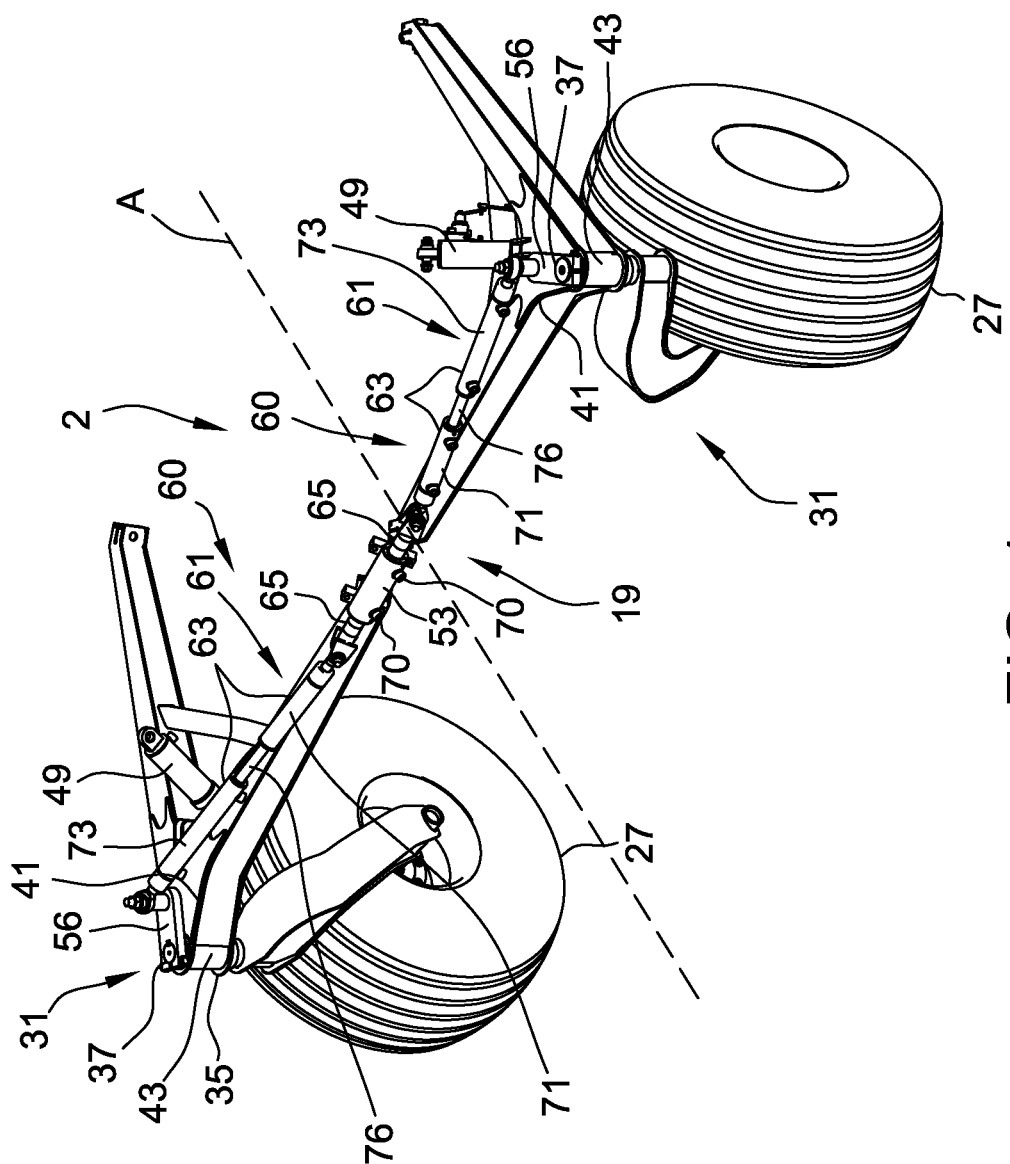
FIG. 1 is a front perspective view of a steered caster wheel system.

Referring to FIG. 1, a steered caster wheel system is referenced generally as "2". In the illustrated embodiment, the caster wheel system 2 includes two swivel caster assemblies 31 each including a caster wheel 27. In other embodiments, the steered caster wheel system 2 may include a single caster assembly 31. The term "caster wheel" includes a wheel mounted to a frame or chassis at a generally vertically oriented caster pivot B (FIG. 2) so that the caster wheel is able to swivel about the caster pivot.

Figure 2:
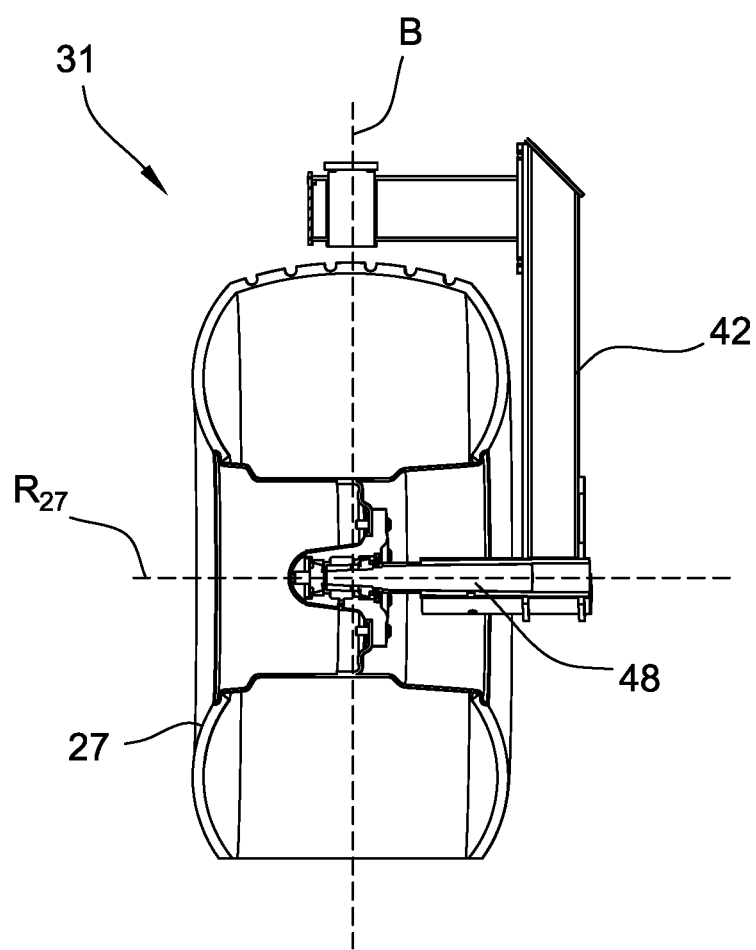
FIG. 2 is a cross-section front view of a caster wheel assembly.
Figure 3:
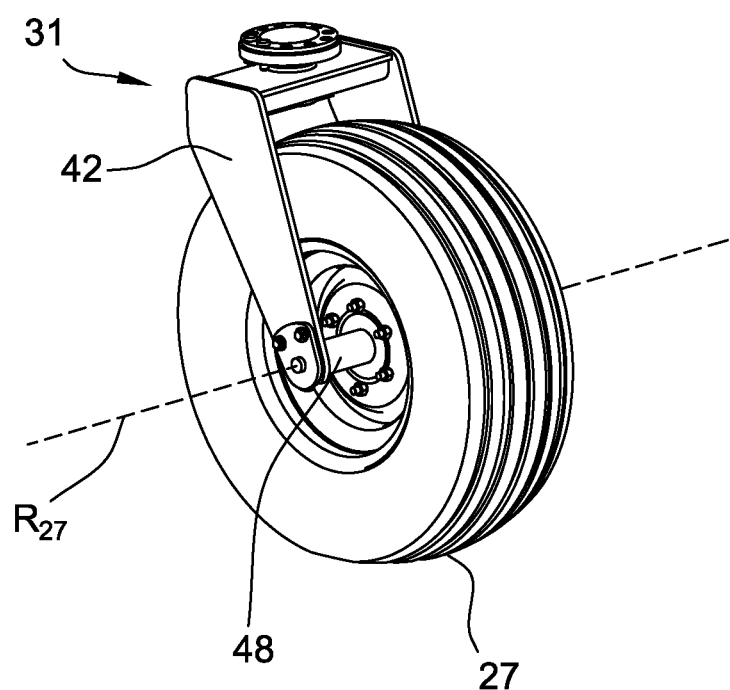
FIG. 3 is a perspective view of another embodiment of a caster wheel assembly.

Each caster wheel assembly is connected to a subframe 41. Generally the first and second caster assemblies 31 and subframes 41 described herein are symmetric and description herein of an assembly or subframe also applies to the second assembly or subframe (e.g., description of a hub of the assembly indicates that the first assembly has a first hub and that the second assembly has a second hub). Referring now to FIG. 2, each caster wheel assembly 31 includes a wheel 27 that rotates about an axle 48 and about a rotational axis $R_{27}$ that extends through the axle 48. The axle 48 is connected to a leg assembly 42. In the embodiment illustrated in FIG. 2, the leg assembly 42 includes a single leg that attaches to an inner side of the wheel axle. In other embodiments and as shown in FIG. 3, the leg assembly 42 includes two legs that connect to the axle 48 of the caster wheel assembly 31 on each side of the wheel 27 (as with a caster fork).

In the embodiment illustrated in FIG. 2, the caster wheel 27 is directly below its steering axis B. In this configuration, when the wheel 27 is aligned forward, the steering axis B intersects the rotational axis $R_{27}$ of the wheel 27. In other embodiments and as shown in FIGS. 1 and 3, the wheel 27 may be offset from the steering axis B. The rotational axis $R_{27}$ of the wheel self-orients to be behind the steering axis B as the caster moves in a direction of travel.

Each assembly 31 includes a hub 35 (FIG. 1) and a caster shaft 37 that rotates within the hub 35. The swivel caster assemblies 31 may include bushings or bearings within the hub 35 that allow for rotation of the shaft 37 within the hub 35. Each caster shaft 37 is connected to the leg assembly 42 that connects to the caster wheel axle 48.

Figure 4:
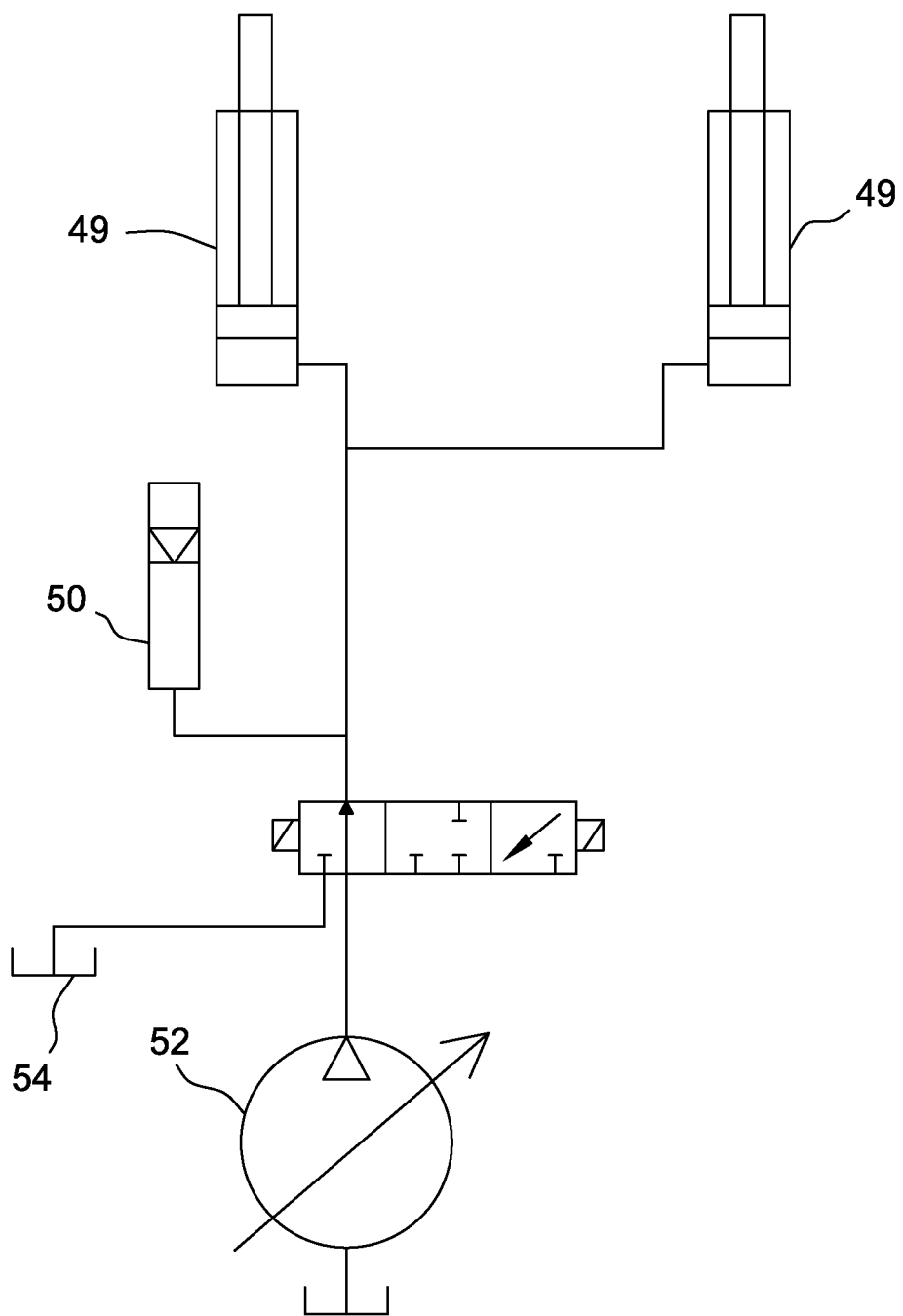
FIG. 4 a schematic view of a hydraulic suspension system of the steered caster wheel system.
Figure 12:
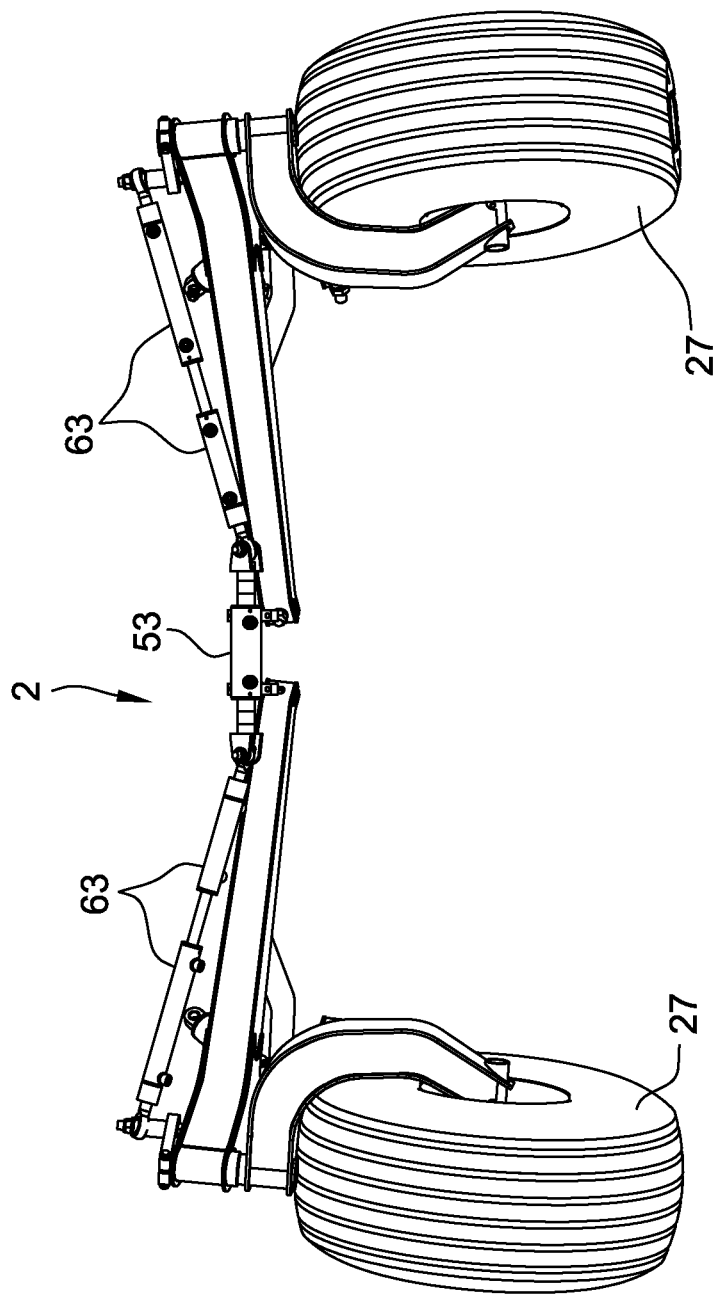
FIG. 12 is a front view of the steered caster wheel system with the wheels in a raised positon.
Figure 13:
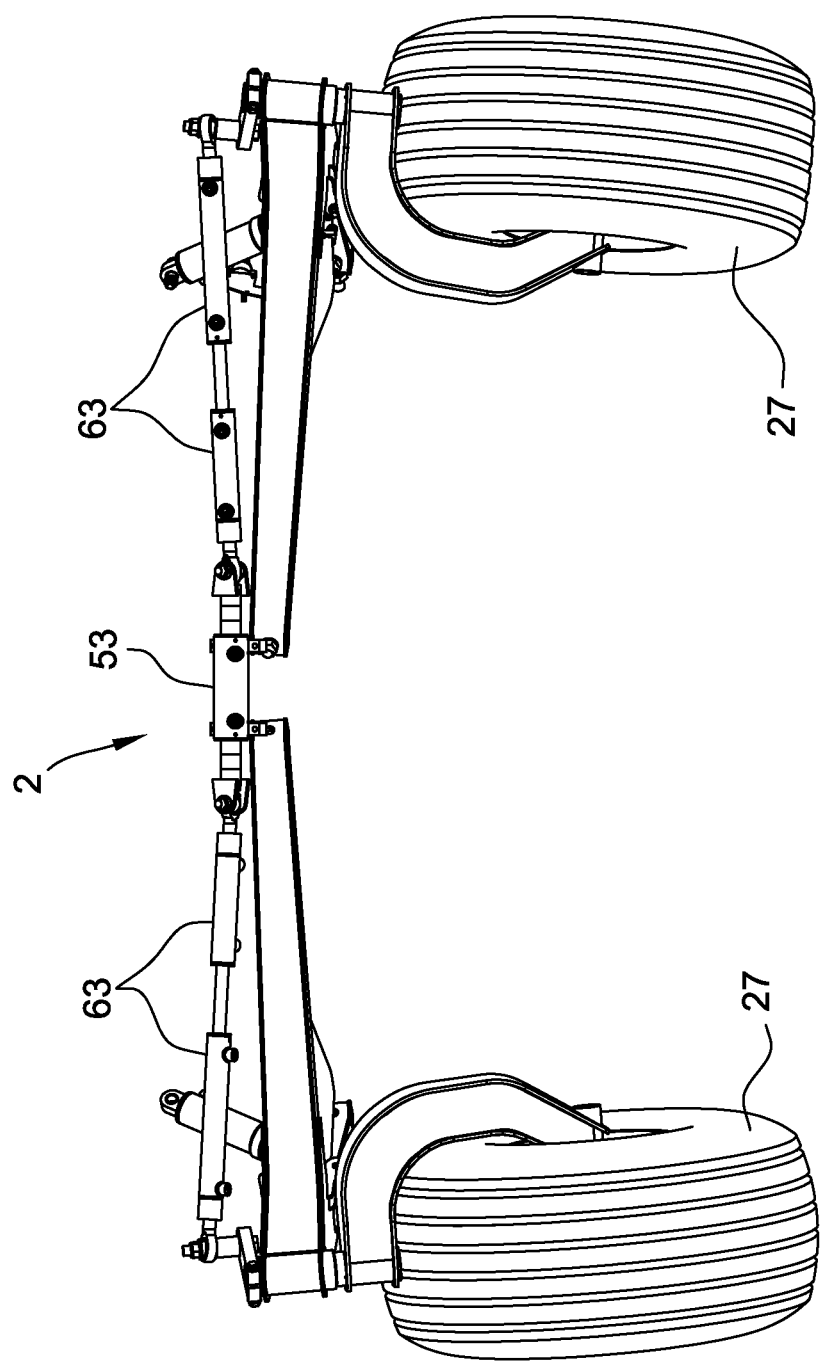
FIG. 13 is a front view of the steered caster wheel system with the wheels in a lowered positon.

The first and second caster assemblies 31 are each connected to the subframe 41 by a swivel joint 43 formed by the hub 35 and shaft 37. The subframes 41 may be suspended from a chassis by a mechanism having a suspension element 49, shown as a hydraulic cylinder in the illustrated embodiment. With reference to FIG. 4, each cylinder 49 may be connected to an accumulator 50 of a suspension system with the hydraulic fluid being provided from a source 54 by a hydraulic pump 52. Other suspension elements such as shock absorbers may be used in other embodiments. The suspension system allows the wheels 27 to move vertically relative to the chassis to which the suspension element 49 is connected such as in a raised position (FIG. 12) or in a lowered position (FIG. 13).

Figure 5:
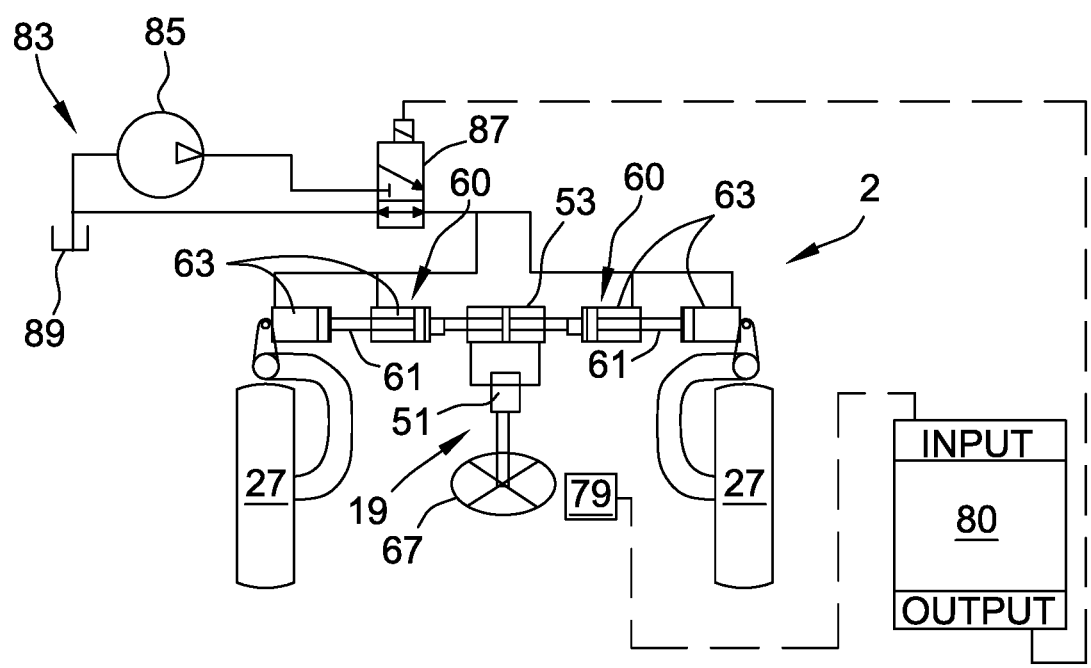
FIG. 5 is a schematic view of the steered caster wheel system showing the steering system.

The caster wheels 27 are connected to a steering system 19 which selectively controls the swivel position of the caster wheels 27. The "swivel position" of the caster wheels generally refers to the angular position of the caster wheels relative to the longitudinal axis A. The steering system 19 may include a steering actuator 53 (shown as a hydraulic cylinder) connected to the caster assemblies 31 by tie rods 61 with each tie rod 61 being connected to an opposite side of the steering actuator 53. Each tie rod 61 connects to a linkage 56 connected to the caster assembly shaft 37. The steering actuator 53 may be connected to a chassis of the vehicle. An orbital valve 51 (FIG. 5) regulates fluid flow to the steering cylinder 53 based on input from a steering mechanism such as a steering wheel 67. The steering system 19 may include a steering pump (not shown) to provide the fluid flow.

In the illustrated embodiment, the steering actuator 53 is a hydraulic cylinder such as a double acting hydraulic cylinder having a through rod 65 that extends from each side which pushes/pulls the tie rods 61 to commonly align the caster wheels 27 during caster wheel steering. The steering cylinder 53 includes inlet and outlet ports 70. Fluid flows through the ports 70 in a first direction to cause the through rod 65 to move to cause both caster wheels 27 to be steered. Fluid is caused to flow in the opposite direction to actuate the through rod 65 in the opposite direction and to cause the caster wheels to be steered in the opposite direction.

In some embodiments, the steering system 19 may be selectively disabled by a disengagement system 60 to allow the caster wheels 27 to freely pivot. The steering system 19 may be selectively operable in a caster wheel steering mode in which the caster wheels 27 are steered and a non-caster wheel steering mode in which caster wheels 27 are free to pivot. The caster-wheel steering mode and non-caster wheel steering mode may be selected by an operator.

With reference to FIG. 1, the disengagement system 60 includes a disengagement cylinder 63 within the tie-rods 61 to enable selective steering of the caster wheels 27. In the caster wheel steering mode, the disengagement cylinders 63 are in a locked position such that actuation of the steering actuator 53 causes pivoting movement of the caster wheels 27 (i.e., the tie-rods 61 are a fixed length). In the non-caster wheel steering mode, the disengagement cylinders 63 are allowed to float (i.e., fluid is allowed to freely flow with little or no pressure), thereby disengaging the movement of the steering cylinder 53 from the caster wheels 27 (i.e., the tie-rods 61 are variable in length). As such, actuation of the steering actuator 53 will not be translated through the disengagement cylinders 63 to the caster wheels 27 and the caster wheels 27 will be allowed to freely pivot in the non-caster wheel steering mode. Any suitable disengagement system 60 that operates to selectively and mechanically disengage caster wheel steering may be used unless stated otherwise.

In the illustrated embodiment, each tie-rod 61 includes a disengagement cylinder 63, the disengagement cylinder 63 being a three-position cylinder. The three-position cylinder has an inner barrel 71, outer barrel 73 and a common rod 76 between the inner and outer barrels. In other embodiments, the three-position cylinder may have two joined barrels in the middle of the cylinder 63.

The outer barrel 73 is connected to the steering linkage 56 attached to the caster shaft 37. Each inner barrel 71 is pivotally connected to the steering actuator 53 with the steering actuator being mounted to a chassis or frame of the vehicle. These pivotal connections enable the left and right portions of the steering system 19 to move with each respective caster wheel 27 as the caster wheel 27 moves up and down in response to uneven terrain.

The disengagement cylinders 63 are connected to a hydraulic system 83 (FIG. 5) that regulates the fluid flow to the cylinders 63. The hydraulic system 83 includes a pump 85, a valve 87 and a hydraulic fluid tank 89. In caster wheel steering mode, the valve 87 allows oil into the cylinders to lock-out the disengagement cylinders 63 with pressure created by pump 85. In the drive-wheel steering mode, valve 87 is shifted to allow fluid to freely flow in and out of the disengagement cylinders 63 and back to the tank 89.

The hydraulic system 83 is configured such that, for each disengagement cylinder 63, the base end of one barrel and the rod end of the other barrel are pressurized during the float mode. This allows one barrel to be locked in an extended position and the other barrel to be locked in a retracted position during the caster-steering mode to achieve an intermediate tie-rod 61 length (i.e., a length that is between the maximum length at which both barrels are extended and the minimum length at which both barrels are retracted). In the float mode, the common tie-rod 76 may freely float in and out of each barrel as the caster wheel moves.

The disengagement system 60 includes a mode selector 79 and a control unit 80 that controls the valve 87. The mode selector 79 allows an operator to select a desired mode of operation (i.e., caster wheel steering or non-caster wheel steering). The control unit 80 receives the signal from the mode selector 79 and controls the mode of the steering system 19 in response to the signal. The control unit 80 sends a signal to the valve 87 instructing the valve 87 to close when the caster wheel steering mode is selected. The control unit 80 transmits a signal to the valve 87 to open in the non-caster wheel steering mode.

In some embodiments, the steering system 19 is adapted to steer the caster wheels 27 through a steering angle that is limited, such as by the range of travel of the steering cylinder 53. The operator may sense when the steering system 19 is in the stopped position as further movement of the steering wheel in the clockwise or counterclockwise position is prevented.

In the caster wheel steering mode, the steered caster wheel system 2 includes mechanical connections from the steering mechanism 67 to the caster wheels 27 for steering of the caster wheels 27 (i.e., includes only mechanical linkages and/or hydraulic components to translate movement of the steering mechanism into caster wheel steering). In this mode, pivoting of the caster wheels 27 is not a response to a control unit signal. In some embodiments, the steered caster wheel system 2 does not include sensors for sensing the position of the caster wheels.

In alternative embodiments, the steering system 19 may include other arrangements of components that enables the system to operate as described. For example, the steering system 19 may include any of the following components, without limitation: tie-rods, rack and pinion mechanisms, orbital valves, cylinders, motors, and bell cranks. In other embodiments, the steering system includes two steering cylinders 53 with a steering cylinder controlling the orientation of a single caster wheel 27.

Figure 6:
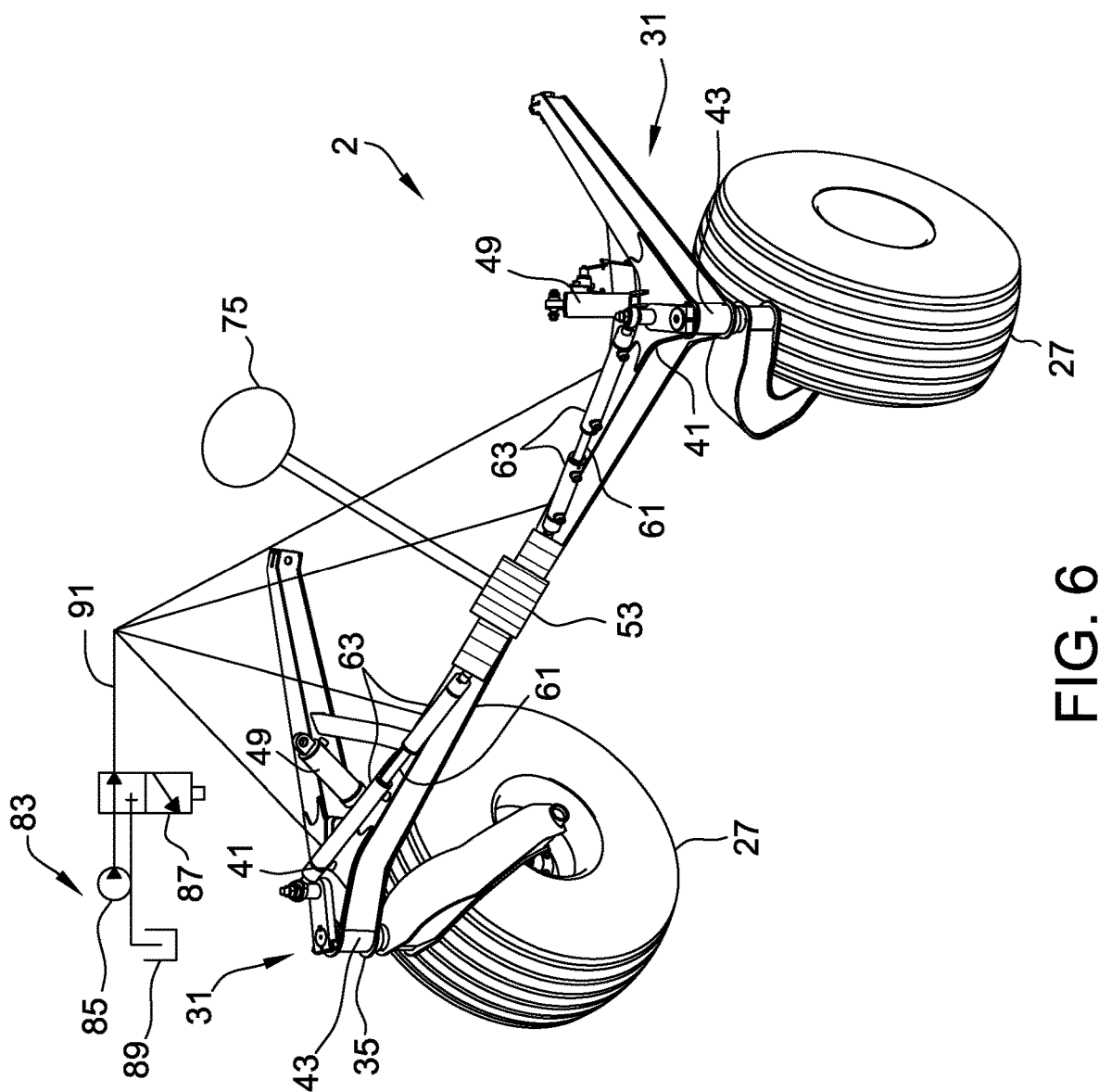
FIG. 6 is a partially schematic and perspective view of another embodiment of a steered caster wheel system.

Another embodiment of a steered caster wheel system 2 is shown in FIG. 6. The system operates similar to the system of FIGS. 1 and 5 except includes a different steering actuator 53 (e.g., rack and pinion or steering gear with a pitman arm) connecting the caster assemblies 31 to the steering mechanism 75.

Figure 7:
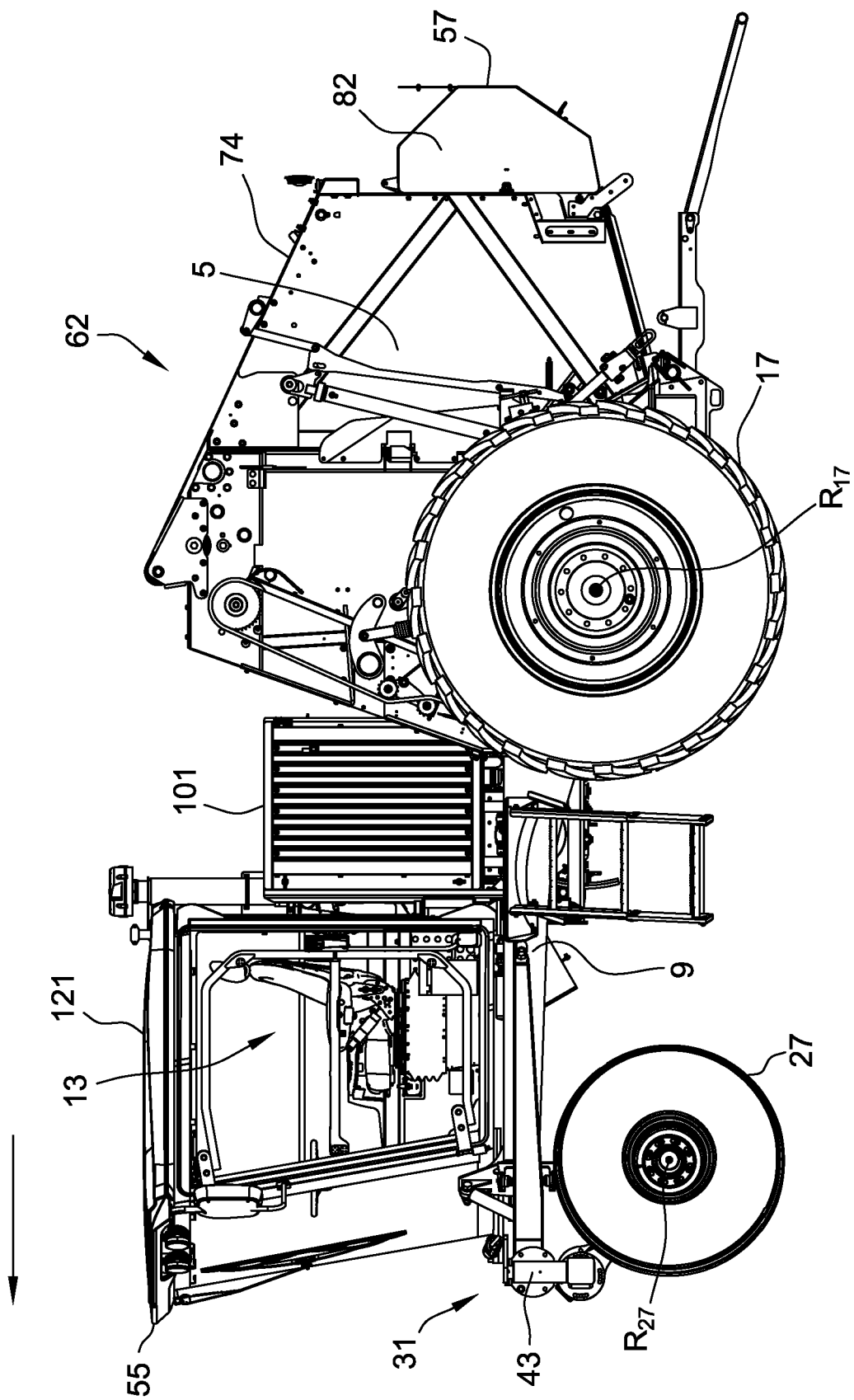
FIG. 7 is a side view of a self-propelled vehicle including the steered caster wheel system.

The caster wheel system 2 may be part of a self-propelled vehicle such as the self-propelled vehicle 62 shown in FIG. 7. In the illustrated embodiment, the vehicle includes a baling device 5 for forming a bale of crop or forage material. In other embodiments, the self-propelled vehicle 62 may be an agricultural vehicle such as a rake, mower or mower conditioner, merger, sprayer, windrower, broadcast spreader, nut or fruit harvester or the like. In other embodiments, the vehicle 62 is configured for non-agricultural use (e.g., construction, shipping or the like). Reference herein to the bale device 5 should not be considered limiting and any suitable device may be substituted for the baling system unless stated differently (e.g., cutting or mower head, sickle bar, spray tank and/or booms, harvesting devices (e.g., grape or nut harvesting devices), broadcast spreader or the like). In some embodiments, the vehicle 62 is adapted to carry a load (e.g., bale, herbicide, fertilizer, or harvested crop such as nuts or fruits).

The self-propelled vehicle 62 includes front caster wheels 27 that are part of the steered caster system 2. The vehicle 62 also includes rear drive wheels 17. The rear drive wheels 17 may be independently powered and controlled by motors (e.g., hydraulic motors). Independent control of the first and second rear drive wheels 17 allows the wheels to rotate at different rates or even in different directions. This allows the vehicle 62 to turn in its own footprint and consistent with a zero-turn radius profile.

The device 5 (e.g., bale forming system 5) is supported by a chassis 9. In embodiments in which the device is a baler, the vehicle also includes a pick-up device 11 (FIG. 8) that rotates to feed crop or forage material to the bale forming system 5. The vehicle 62 is controlled from an operator station 13 and is powered by an engine 101. Each of the operator station 13, engine 101 and device 5 are supported by the chassis 9 (i.e., the engine 101 is not part of a towed vehicle such as a tractor that releasably connects to the device by a hitch assembly attached to an implement tongue).

The first and second caster assemblies 31 are connected to the chassis 9 and the swivel positon of the caster wheels 27 is selectively controlled by the steering system 19 (FIG. 1) as determined by the mode of operation of the vehicle (i.e., caster wheel steering mode or non-caster wheel steering mode such as a drive wheel steering mode).

Each of the wheels 17, 27 is connected to the chassis 9 and can be rotated around a rotational axis $R_{17}$, $R_{27}$. In the illustrated embodiment, the drive wheels 17 have a common rotational axis $R_{17}$ and the caster wheels 27 have a common rotational axis $R_{27}$. In other embodiments, the drive wheels 17 are offset from each other and have different axes of rotation and/or the caster wheels 27 are offset from each other and have different axes of rotation. In this embodiment, the vehicle 62 includes four wheels, though in other embodiments, the vehicle may include any number of drive and caster wheels.

As shown in FIG. 7, the drive wheels 17 have a diameter that is larger than a diameter of the caster wheels 27. In some embodiments, the ratio of the diameter of the drive wheels 17 to the diameter of the caster wheels 27 is at least about 3:1 or even at least about 1.25:1.

The offset of the caster wheels (i.e., distance between the axis of rotation $R_{27}$ of the wheel and a swivel joint 43) may be at least 4 inches, at least about 8 inches or from about 10 to about 18 inches. These ranges are exemplary and other ranges may be used unless stated otherwise. In some embodiments, the offset may be eliminated.

Figure 9:
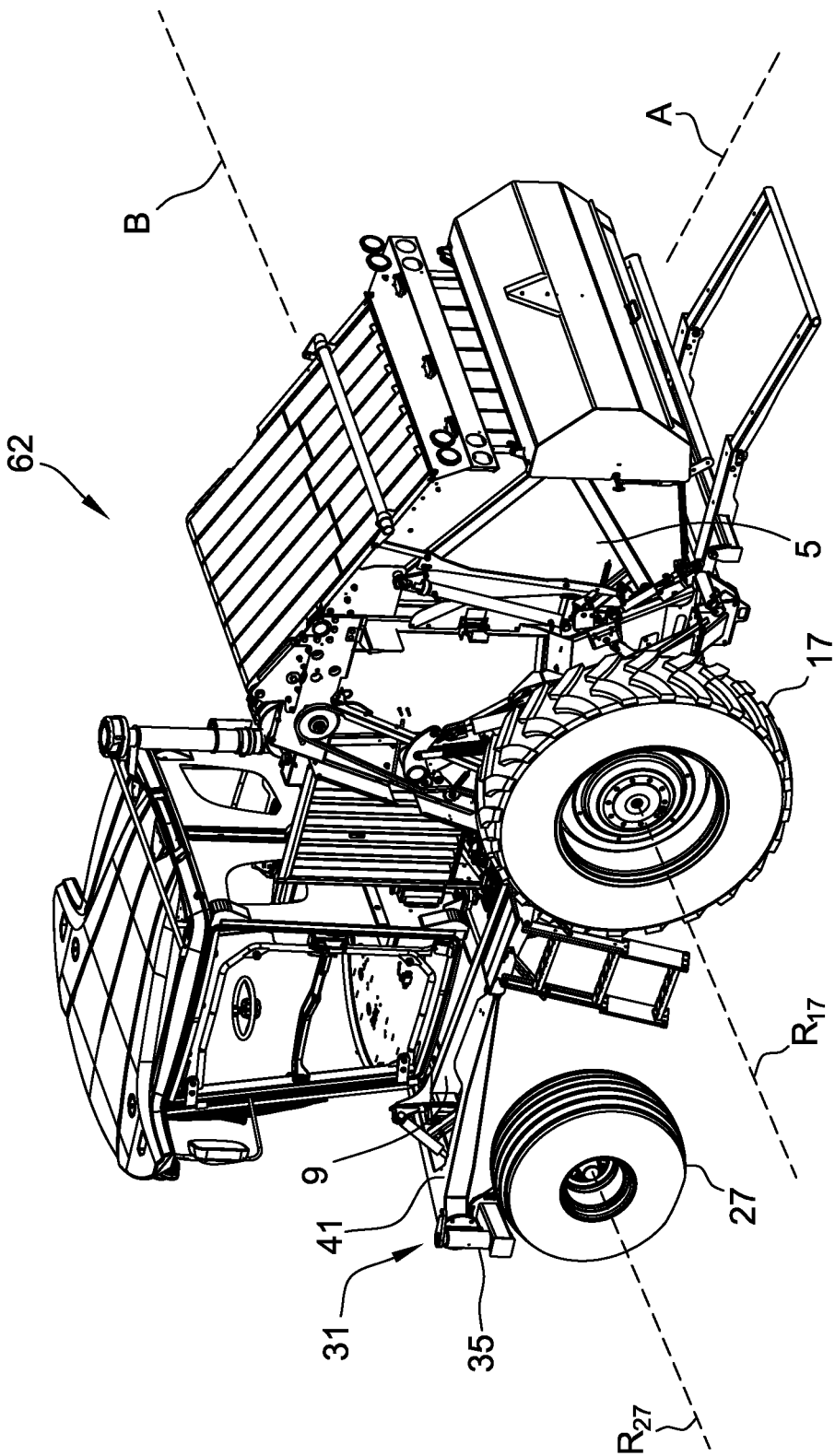
FIG. 9 is a perspective view of the self-propelled vehicle.

The first and second caster wheels 27 are pivotally connected to the chassis 9 (FIG. 7). The caster wheels 27 and/or drive wheels 17 may be spaced to allow the chassis 9 to support a device (e.g., agricultural implement) such as a round baler 5 and pick-up device 11 as shown in the illustrated embodiment. In some embodiments, the vehicle 62 includes a single front caster wheel 27 (e.g., one front caster wheel centered relative to the lateral axis of the vehicle). With reference to FIG. 9, the caster wheels 27 and subframes 41 are independently suspended from the chassis 9 to absorb forces transmitted during travel over uneven terrain.

The drive wheels 17 are fixed to the chassis 9 such that the wheels 17 maintain parallel alignment with a longitudinal axis A (FIG. 9) of the vehicle 62 (i.e., do not pivot with respect to the chassis). The longitudinal axis A of the vehicle extends from a front 55 to a rear 57 of the vehicle 62. As referenced herein, the "front" of the vehicle refers to a leading portion or end of the vehicle relative to the longitudinal axis during conventional operation as indicated by the arrow in FIG. 7. The "rear" refers to the trailing portion or end relative to the longitudinal axis during conventional operation. Similarly, the terms "front wheels" and "rear wheels" refer to the relative position of the wheels relative to the direction of travel of the vehicle during conventional operation. The vehicle also includes a lateral axis B (FIG. 9) that extends from a first side 58 (FIG. 8) to a second side 59 of the vehicle 62 and that is transverse to the longitudinal axis A.

Figure 10:
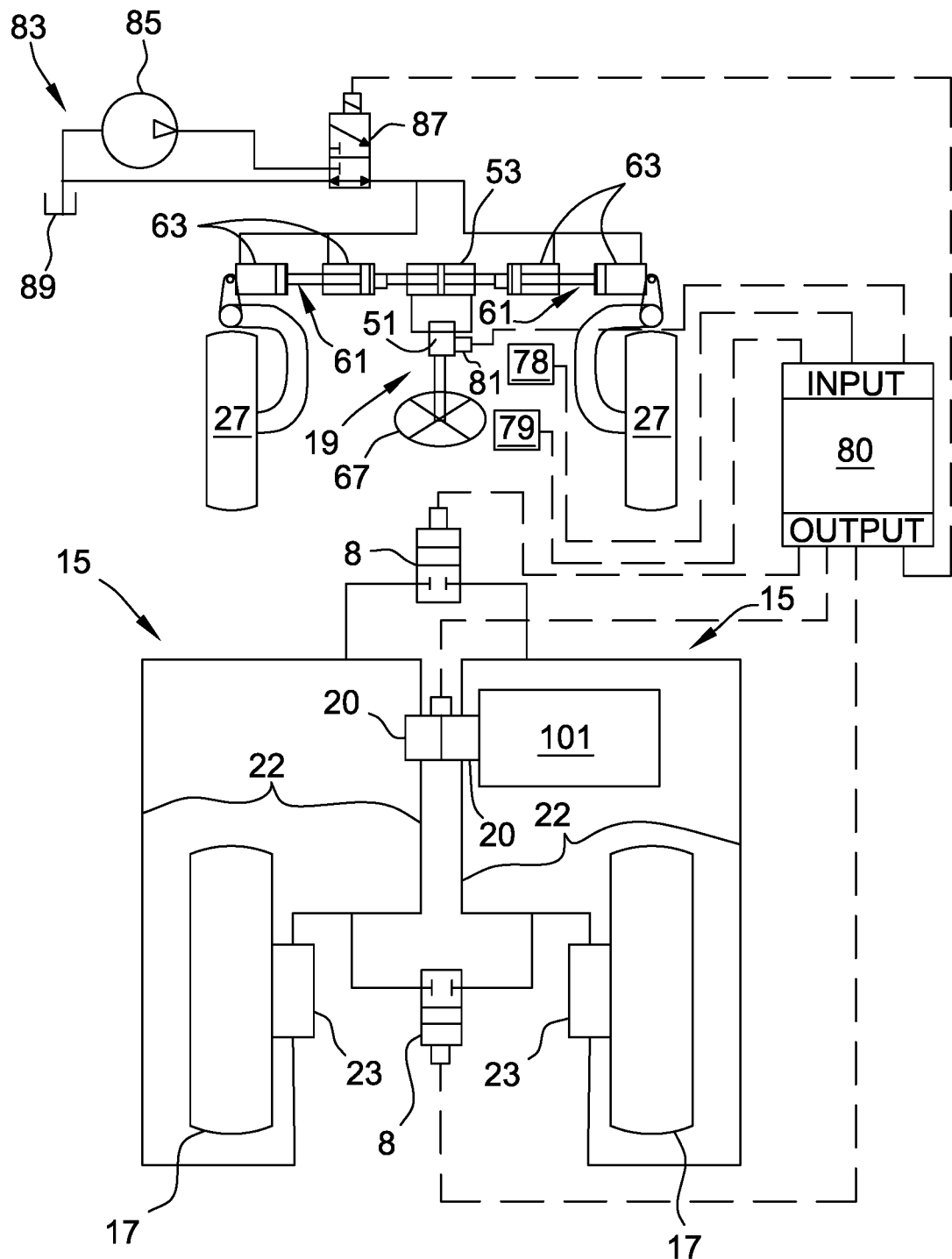
FIG. 10 is a schematic view of the self-propelled vehicle showing the drive system and caster wheel steering system.

With reference to FIG. 10, the first and second drive wheels 17 are each driven and controlled by separate drive systems 15. Each drive system 15 has a drive motor 23 for rotating the drive wheel 17 forward or backward. The drive motors 23 may be hydraulic motors that are driven by a pump 20 that is powered by the engine 101. Each drive wheel 17 may be controlled by a separate circuit (i.e., separate hydraulic pumps 20 with fluid lines 22 connected to the drive wheel motors 23). The first and second pumps 20 may be hydrostatic, variable displacement pumps. In some embodiments, fixed displacement or variable displacement motor(s) may be used.

The vehicle 62 may be driven in a steering mode that corresponds to the caster wheel steering mode or non-caster wheel steering mode described above. In a drive wheel steering mode (corresponding to the non-caster wheel steering mode described above), the vehicle 62 is steered by creating a differential speed between the first and second rear drive wheels 17 (i.e., by creating a difference between the first drive wheel rotational speed and the second drive wheel rotational speed). In this mode, each drive wheel 17 is capable of being driven forward or in reverse independent of the speed and direction of the other wheel (i.e., the drive wheels may be operated in counter-rotation). As an operator controls a steering mechanism (e.g., steering wheel), the rear drive wheels 17 rotate at different speeds to steer the vehicle 62 through an arc or deviation in the travel pathway. The speed and direction of travel (forward or rearward) may be controlled by a separate operator control. In the drive wheel steering mode, the vehicle 62 may be turned within its own footprint. In this mode, the caster wheels 27 are not steered (e.g., the valve 87 (FIG. 5) is open allowing the disengagement cylinders 63 to float). The caster wheels 27 self-align with the direction in which the drive wheels propel the vehicle, i.e., the caster wheels 27 follow the direction of travel of the rear drive wheels 17.

In the caster wheel steering mode, the steering system 19 (FIG. 10) is operable to control the swivel position of the caster wheels 27. In this mode, the drive wheels 17 may be powered equally with differences in the rate of rotation of the drive wheels 17 occurring as a response to the curved path of the vehicle 62 (e.g., with a differential system shown as differential valves 8) compensating the drive systems 15 of the drive wheels).

The wheels 17 are powered and rotated independently by the drive systems 15. Accordingly, the wheels 17 can be rotated at different speeds by driving the motors 23 at different speeds. In the drive wheel steering mode (i.e., non-caster wheel steering mode), the wheels 17 are driven at different speeds by the drive system 15. For example, in this mode, the motors 23 receive different amounts of fluid from the respective pumps 20 to differentiate the speed of the wheels 17. Separate fluid lines 22 extend between each pump 20 and drive motor 23 to independently rotate the wheels 17. The direction of fluid flow may be forward or reverse to independently rotate the wheels forward or reverse to propel the vehicle forward, reverse, through an arc (e.g., as during steering) or about a vertical axis midway between the drive wheels 17 (e.g., as during zero turn steering).

In the caster wheel steering mode, the pumps 20 provide equal amounts of fluid to the motors 23 but the wheels 17 are able to rotate at different speeds due to a differential system 8 (shown as differential valves in FIG. 10) that transfers fluid between the drive systems. Alternatively, the drive wheels 17 may also be controlled for steering in the caster wheel steering mode by supplying different amounts of fluid from the respective pumps 20 to the motors 23 to differentiate the speed of the wheels 17 (e.g., as in a "hybrid" steering mode).

Figure 11:
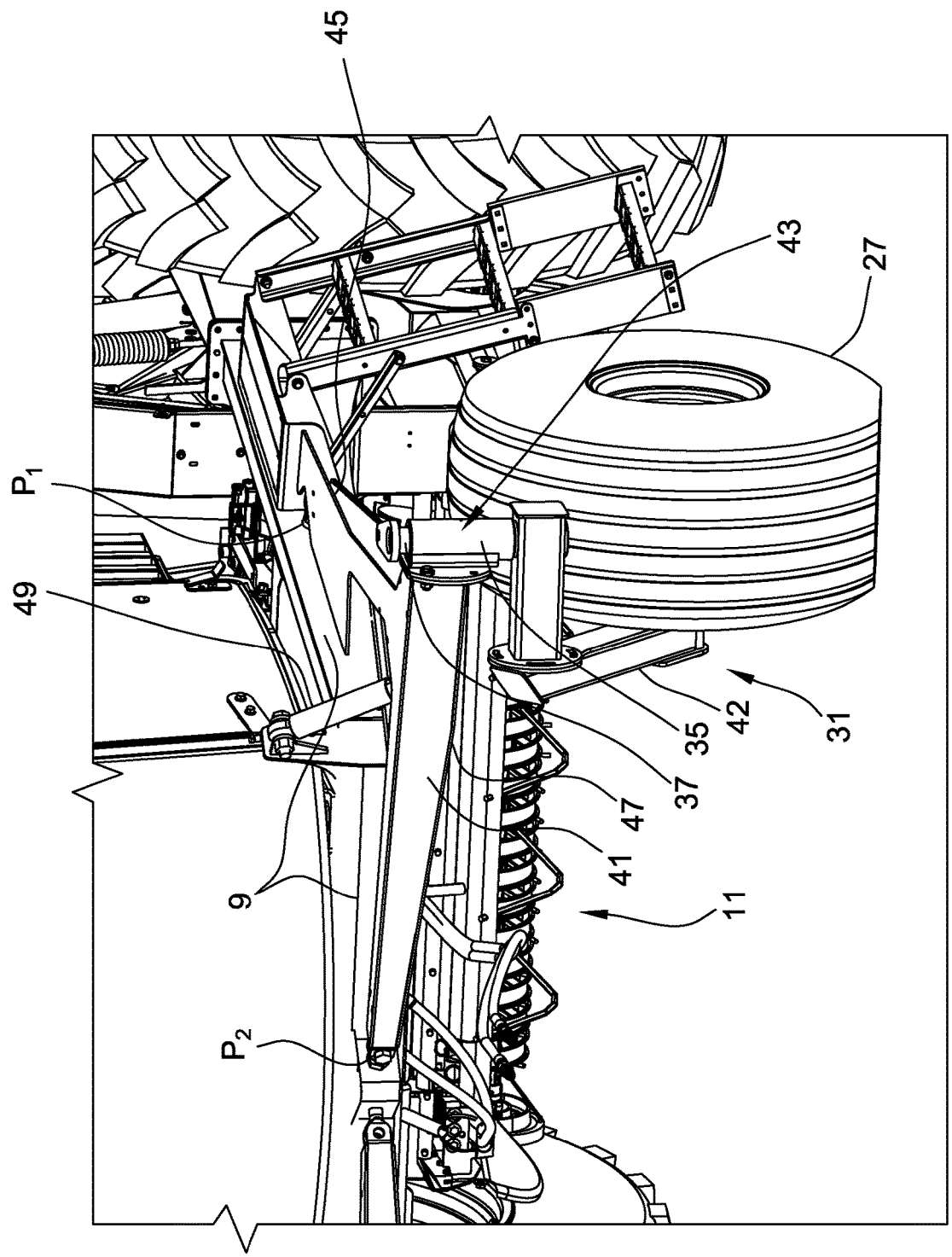
FIG. 11 is a perspective view of a caster assembly of the self-propelled vehicle.

With reference to FIG. 11, each subframe 41 may be pivotally attached to the chassis 9 at an outer pivot point $P_1$ and an inner pivot point $P_2$. In this arrangement, the chassis 9 is supported by the subframes 41 and the chassis 9 and components carried by the chassis 9 (e.g., operator station and cab) may move up and down relative to the subframes 41 as the vehicle 62 travels over uneven terrain.

As shown in FIG. 11, the subframe 41 has two arms 45, 47 that extend from the chassis 9. The swivel joint 43 is at the point at which the arms 45, 47 meet and is forward of the inner and outer pivot points $P_1$, $P_2$ relative to a longitudinal axis A (FIG. 9) of the vehicle. The swivel joint 43 is also outward to both the inner and outer pivot points $P_1$, $P_2$ relative to the lateral axis B (FIG. 9) of the vehicle 62 (i.e., the outer pivot point $P_1$ of each subframe 41 is positioned between the inner pivot point $P_2$ and the point of attachment of the suspension element 49 relative to the lateral axis B).

Figure 8:
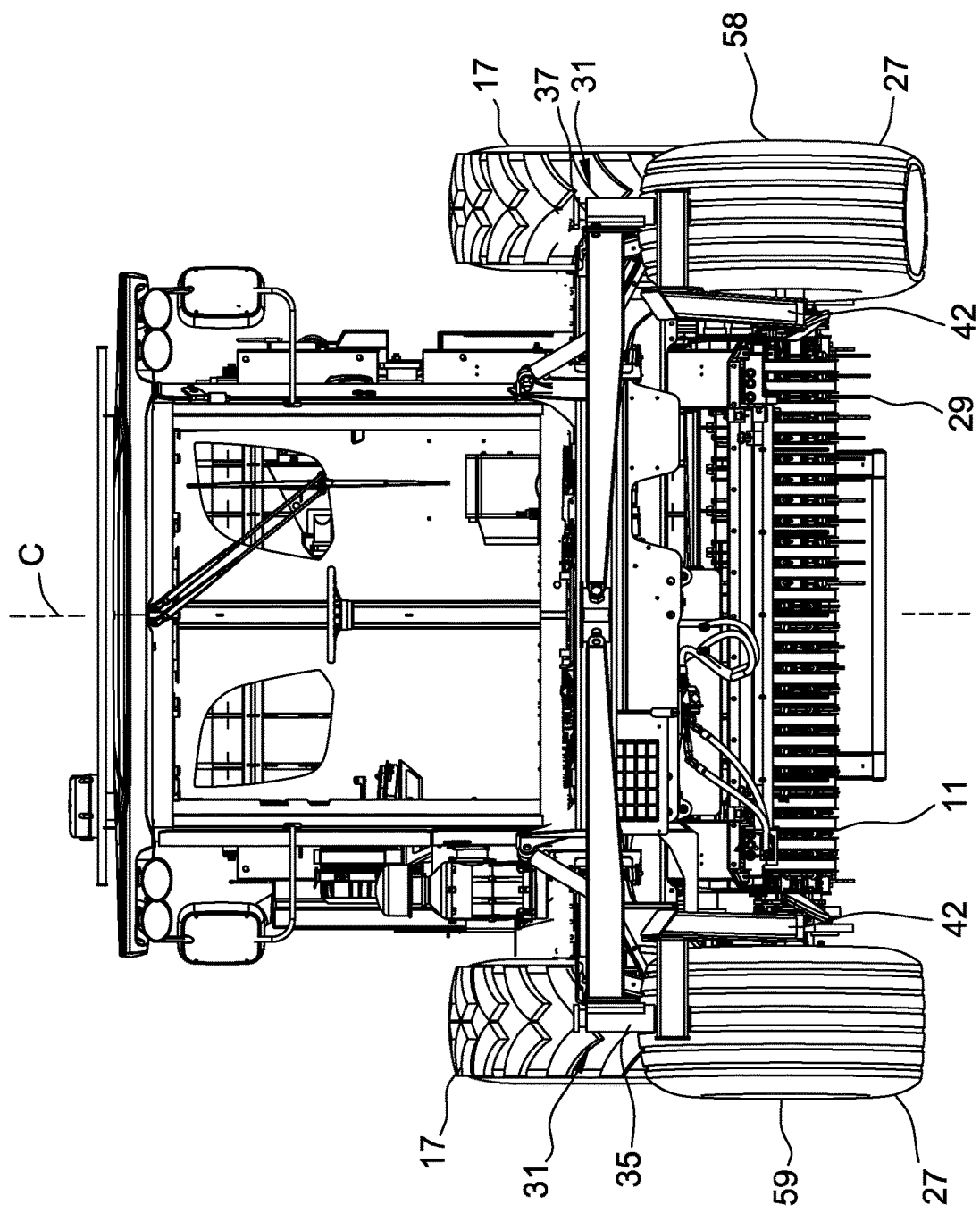
FIG. 8 is a front view of the self-propelled vehicle.
Figure 14:
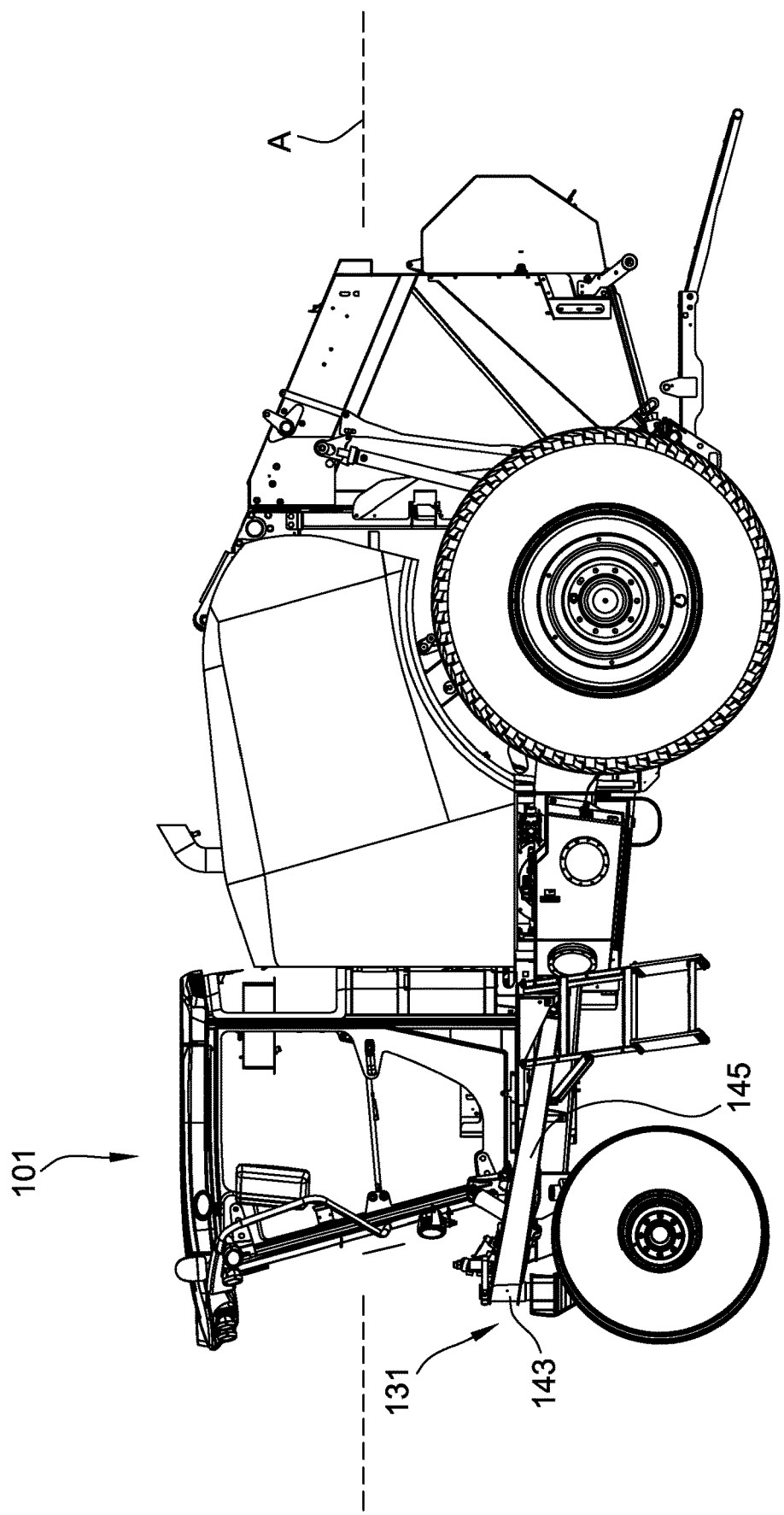
FIG. 14 is a side view of another embodiment of a self-propelled vehicle having a steered caster wheel system.
Figure 15:
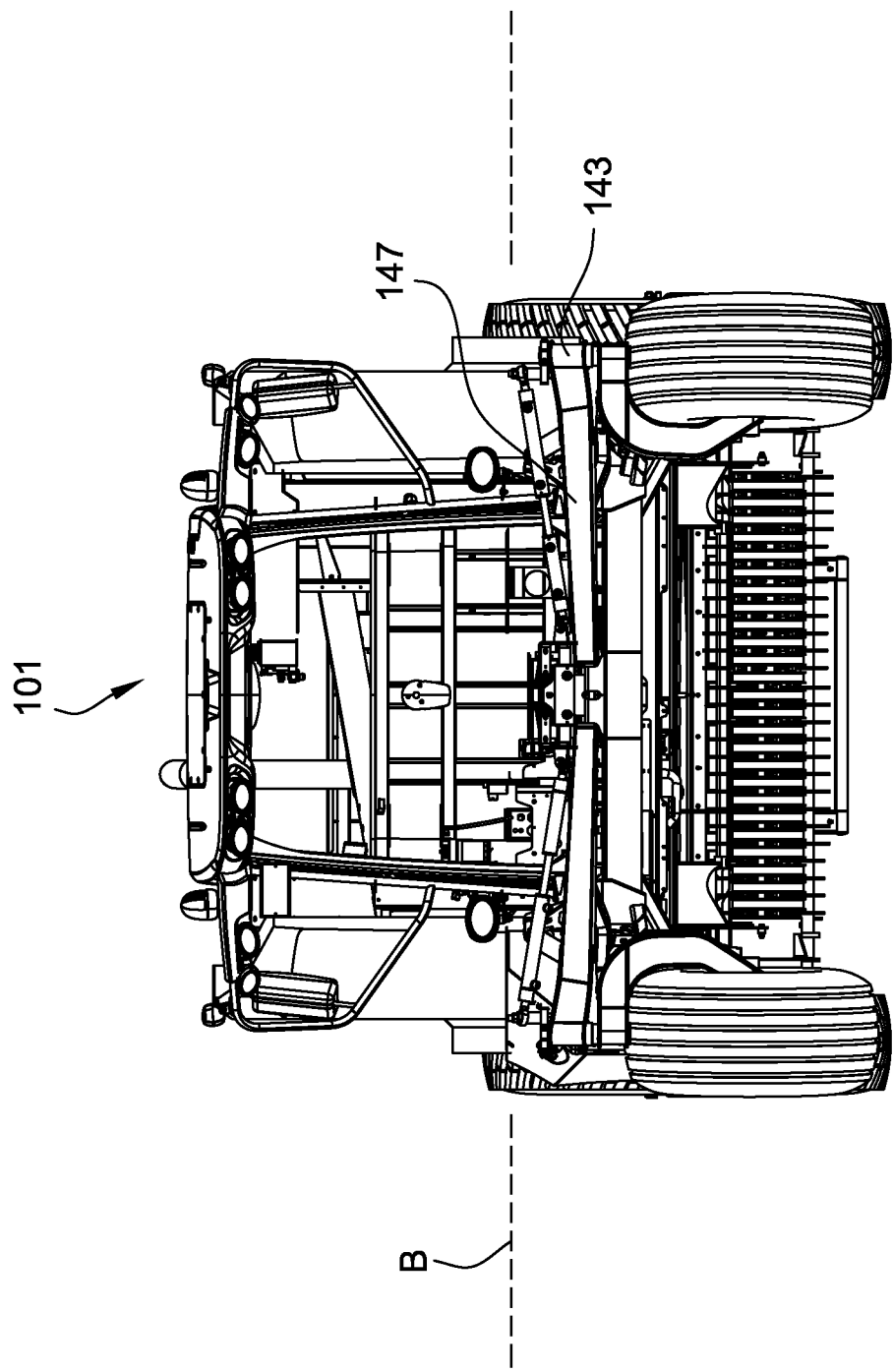
FIG. 15 is a front view of the self-propelled vehicle of FIG. 14.

In the embodiment illustrated in FIGS. 7-9, the first arm 45 is generally parallel to the longitudinal axis A (FIG. 9) and the second arm 47 is generally parallel to the lateral axis B. In other embodiments (FIGS. 14-15), the first arm 145 is angled upward toward the swivel joint 143 with respect to the longitudinal axis A. In the embodiment illustrated in FIGS. 14-15, the second arm 147 is generally parallel to the lateral axis B.

In other embodiments, the subframe 41 has a single arm or may include any other arrangement of components that allows the caster wheels 27 to be positioned below the chassis 9 to support the vehicle 62.

The vehicle 62 includes a control system to control the drive wheels 17 and the front caster wheels 27 based on inputs from an operator. The control system includes the control unit 80 (FIG. 10), speed and direction control device 78, the mode selector 79 and steering mechanism which is shown as a steering wheel 67. The speed and direction control device 78, mode selector 79 and steering wheel 67 may be controlled from the operator station 13.

The control unit 80 includes a processor and a memory. The processor processes the signals received from various sensors, selectors and control devices of the system. The memory stores instructions that are executed by the processor.

Control unit 80 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable control unit 80, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Wash.). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

The mode selector 79 may be, for example, part of a touch screen, a soft key, toggle switch, selection button or any other suitable interface for selecting the steering mode. The speed and direction control device 78 is typically hand-operated and may be a sliding lever that that causes an increase in forward speed as the lever is slid forward of a neutral position and an increase in reverse direction as the lever is slid rearward of the neutral position. The direction and speed control device 78 produces a signal in response to its position and the signal is transmitted to the control unit 80. The control unit 80 produces an output signal transmitted to the hydraulic pumps 20 that drive the rear wheels 17. The speed may also be controlled by a throttle that controls the engine speed. The vehicle 62 may be stopped by moving the direction and speed control device 78 to a zero-speed setting and/or by operating foot brake levers.

In the illustrated embodiment, steering may be performed by a steering mechanism shown as a steering wheel 67 which regulates the steering system. For example, in the drive wheel steering mode, a sensor 81 measures the direction and angle of the steering wheel 67 and sends signals to the control unit 80. The control unit 80 produces a signal that is transmitted to the hydraulic pumps 20 to independently regulate the rotational speeds of the first and second drive wheels 17 (i.e., the rotation speed and direction of rotation of each drive wheel 17).

In other embodiments, speed and/or steering may be controlled by different operator controls such as wheel levers, digital inputs, joysticks, dual sticks, and headsets.

In some embodiments, the self-propelled vehicle 62 is configured for autonomous operation. The vehicle may include sensors (e.g., cameras, GPS sensors and the like) that sense the position of a windrow and/or that may sense the position of the vehicle in the field. The vehicle 62 may also include a control unit that autonomously sends signals to control the vehicle speed and steering systems. In some embodiments, the field in which the vehicle is propelled is mapped and the field map is used to autonomously control the operation of the vehicle in the field. In such embodiments, the vehicle may include a riding station to carry an operator or the operator station may be eliminated.

With reference to FIGS. 7-9, in embodiments in which the vehicle 62 is used to bale forage or crop material, the vehicle also includes a bale forming system 5 that includes belts, rollers, belt tighteners, and a motor that drives the rollers. In this embodiment, the baler forms bales in an expandable baling chamber, though, in other embodiments, the baler may be a fixed chamber baler. In the baling chamber, multiple belts are routed around the rollers and moved as a bale is formed, though a single bale forming belt may alternatively be used. In this embodiment, tension is maintained in the bale forming belts by the one or more belt tighteners to ensure a properly compressed bale.

The baler includes a pick-up device 11 (FIG. 8) to pick up crop or forage material. The pick-up device 11 is shown in a raised position. During baling, the pick-up device 11 is in a lowered position in which the rotating teeth of the device contact the crop or forage material and direct it toward the baling chamber. As material is picked up by the pick-up device, and deposited in the baling chamber, the material is compressed by the plurality of bale forming belts.

During operation of the baler, the baler moves across a field and along a windrow. The windrow may be formed by a mechanism, such as rakes, connected to the baler. Alternatively, the windrow may have been previously formed when the baler is driven through the field. The material transport and processing system collects material from the field and delivers the material to the baling chamber. The bale forming system forms the material into a bale within the baling chamber. Once a full bale is formed, the material transport and processing sequence ceases and a wrapping sequence is commenced by the wrapping mechanism 82.

Once the wrapping sequence is completed, a tailgate 74 is opened and the full bale is discharged from the baling chamber and guided away from the baler by a ramp. Further details relating to the baling operation within the baling chamber can be found in U.S. Pat. No. 7,181,900, which is incorporated herein by reference for all relevant and consistent purposes.

The engine 101 (e.g., gas or diesel powered engine) drives one or more hydraulic pumps which in turn power the various hydraulic motors and cylinders (e.g., first and second drive wheel motors, baling chamber motor, pick-up device motor, pick-up device lift cylinder, lift-gate cylinder and/or ramp cylinder). The engine 101 also provides power for the electrical systems of the vehicle. The engine 101 is between the rotational axes $R_{17}$ of the rear drive wheels 17 and the rotational axes $R_{27}$ of the caster wheels 27. More specifically, the engine 101 is between the baling chamber and the operator station 13.

In some embodiments, the "operator station" comprises the seat and controls for steering and controlling the speed of the vehicle. As shown in FIG. 7, the operator station 13 is enclosed in a cab 121. The operator station 13 is forward of the bale forming system 5, forward of the rotational axis $R_{17}$ of the rear drive wheels 17 and is also forward to the engine 101. At least a portion of the operator station 13 and/or cab 121 are disposed above the caster wheels 27 (i.e., above the caster wheels 27 when generally aligned with the longitudinal axis A as the vehicle is propelled forward.) Stated otherwise, at least a portion of the operation station 13 and/or cab 121 overlap the front caster wheels 27 relative to the longitudinal axis A (e.g., overlap a trailing portion of the caster wheel, overlap the caster wheel axle or overlap the entire caster wheel when the caster wheels 27 is generally aligned with the longitudinal axis A as the vehicle is propelled forward).

Compared to conventional systems, the steered caster wheel systems of embodiments of the present disclosure have several advantages. In the caster wheel steering mode, caster wheel steering is controlled mechanically (e.g., mechanical connections between a steering mechanism such as a steering wheel and the caster wheels). By using mechanical connections for caster wheel steering rather than a drive-by-wire system, position sensor(s) for sensing the position of the caster wheels may be eliminated which simplifies the construction and operation of the system. Mechanical connections may also be more reliable than a drive-by-wire system.

In embodiments in which the steered caster assembly includes a subframe with a first arm (i.e., longitudinal arm) that angles upward toward the swivel joint relative to the longitudinal axis, the orientation of the caster wheel along its pivot axis may be maintained relatively constant as the wheel moves through the range of travel provided by the suspension (e.g., "bump-steer" may be reduced).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A steered caster wheel system comprising:
   a chassis;
   a caster wheel suspended from the chassis and having a steering axis, the caster wheel rotating about the steering axis through a range of swivel positions;
   a suspension mechanism, the caster wheel being mounted to the suspension mechanism to enable the caster wheel to move relative to the chassis;
   a steering mechanism connected to the caster wheel to control the swivel position of the caster wheel;
   a steering actuator connected to the caster wheel and the steering mechanism; and
   a disengagement system which selectively enables the steering actuator to change the swivel position of the caster wheel in response to movement of the steering mechanism in a caster wheel steering mode and disables the steering actuator from changing the swivel position of the caster wheel in a non-caster wheel steering mode, the disengagement system comprising a cylinder configured to selectively enable the steering actuator to change the swivel position of the caster wheel in response to movement of the steering mechanism in the caster wheel steering mode and disables the steering actuator from changing the swivel position of the caster wheel in the non-caster wheel steering mode, the cylinder being a three-position cylinder connected to the steering actuator and connected to the caster wheel.

2. The system as set forth in claim 1 wherein the steering actuator is selected from a hydraulic cylinder, a rack and pinion mechanism or a steering gear with pitman arm.

3. The system as set forth in claim 1 wherein the steering mechanism and the steering actuator are components of a caster wheel steering system, the steering system having only mechanical connections between the steering mechanism and the caster wheel.

4. The system as set forth in claim 1 wherein controlling the swivel position of the caster wheel is not a response to a control unit signal.

5. A steered caster wheel system comprising:
   a chassis;
   a caster wheel suspended from the chassis and having a steering axis, the caster wheel rotating about the steering axis through a range of swivel positions;
   a suspension mechanism, the caster wheel being mounted to the suspension mechanism to enable the caster wheel to move relative to the chassis;
   a steering mechanism connected to the caster wheel to control the swivel position of the caster wheel;
   a steering actuator connected to the caster wheel and the steering mechanism; and
   a disengagement system which selectively enables the steering actuator to change the swivel position of the caster wheel in response to movement of the steering mechanism in a caster wheel steering mode and disables the steering actuator from changing the swivel position of the caster wheel in a non-caster wheel steering mode, the disengagement system comprising a cylinder configured to selectively enable the steering actuator to change the swivel position of the caster wheel in response to movement of the steering mechanism in the caster wheel steering mode and disables the steering actuator from changing the swivel position of the caster wheel in the non-caster wheel steering mode, the disengagement system comprising a hydraulic circuit, the hydraulic circuit comprising a valve, the valve selectively enabling the cylinder to be pressurized in the caster wheel steering mode and to float in the non-caster wheel steering mode.

6. The system as set forth in claim 5 comprising a control unit comprising a processor and a memory, the memory storing instruction that, when executed by the processor, cause the processor to regulate the disengagement system.

7. The system as set forth in claim 6 comprising a mode selector for selecting the caster wheel steering mode or the non-caster wheel steering mode, the processor causing the disengagement system to enable the steering actuator to change the swivel position of the caster wheel in response to movement of the steering mechanism when the caster wheel steering mode is selected and to disable the steering actuator from changing the swivel position of the caster wheel when the non-caster wheel steering mode is selected.

8. A steered caster wheel system comprising:
   a caster wheel having a steering axis, the caster wheel rotating about the steering axis through a range of swivel positions;
   a steering mechanism for controlling the swivel position of the caster wheel;
   a steering actuator; and
   a disengagement cylinder connected to the steering actuator and connected to the caster wheel, the disengagement cylinder selectively enabling the steering actuator to change the swivel position of the caster wheel in response to movement of the steering mechanism in a caster wheel steering mode and disabling the steering actuator from changing the swivel position of the caster wheel in a non-caster wheel steering mode, the disengagement cylinder being a three-position cylinder connected to the steering actuator and connected to the caster wheel.

9. The system as set forth in claim 8 wherein the steering mechanism is connected to the steering actuator.

10. The system as set forth in claim 8 wherein the steering actuator is a hydraulic cylinder.

11. A vehicle having a steerable suspended caster wheel, the vehicle comprising:
    a chassis;
    a subframe independently suspended from the chassis to allow the subframe to move relative to the chassis as the vehicle travels over uneven terrain;
    a caster wheel assembly rotatably mounted to the subframe at a swivel joint having a steering axis, the caster wheel assembly comprising:
       a leg assembly; and
       a caster wheel rotatably mounted to the leg assembly, the leg assembly and caster wheel being rotatable about the steering axis through a range of swivel positions; and
    a steering actuator connected to the caster wheel to selectively control the swivel position of the caster wheel;
    a steering mechanism connected to the steering actuator to control the steering actuator; and
    a disengagement system which selectively enables the steering actuator to change the swivel position of the caster wheel in response to movement of the steering mechanism in a caster wheel steering mode and disables the steering actuator from changing the swivel position of the caster wheel in a non-caster wheel steering mode, the disengagement system comprising a variable length component connected between the steering actuator and the caster wheel, the variable length component being in a locked position in which the variable length component is at a fixed length in the caster wheel steering mode, the variable length component being in a float mode in which the length of the variable length component varies in the non-caster wheel steering mode.

12. The vehicle as set forth in claim 11 wherein the subframe has a lateral arm and a longitudinal arm that are each pivotally connected to the chassis.

13. The vehicle as set forth in claim 11 wherein the subframe is suspended from the chassis by a suspension element selected from a hydraulic cylinder, shock absorber, air spring, metal spring, or a rubber spring.

14. The vehicle as set forth in claim 11 further comprising a baler supported by the chassis.

15. The vehicle as set forth in claim 11 wherein the variable length component is a cylinder.

16. The vehicle as set forth in claim 15 wherein the disengagement system comprises a hydraulic circuit, the hydraulic circuit comprising a valve, the valve selectively enabling the cylinder to be pressurized in the caster wheel steering mode and to float in the non-caster wheel steering mode.

17. The vehicle as set forth in claim 16 comprising a control unit comprising a processor and a memory, the memory storing instruction that, when executed by the processor, cause the processor to regulate the disengagement system.

18. The vehicle as set forth in claim 11 wherein the steering mechanism is mechanically connected to the steering actuator.

\* \* \* \* \*